US005777890A

United States Patent [19]
Halley et al.

[11] Patent Number: 5,777,890
[45] Date of Patent: Jul. 7, 1998

[54] CONTROL OF MOISTURE ADDITION TO BULK SOLIDS

[75] Inventors: James D. Halley, Cedar Rapids, Iowa; Michael J. Mowbray, Eden Prairie, Minn.; Rodger D. Kurtz, Franklin, Tenn.

[73] Assignee: BetzDearborn Inc., Trevose, Pa.

[21] Appl. No.: 585,337

[22] Filed: Jan. 11, 1996

[51] Int. Cl.⁶ .................. C10L 5/24; C10L 7/00
[52] U.S. Cl. .............. 364/500; 364/502; 364/496; 44/626; 44/620; 44/594
[58] Field of Search .................. 364/496, 500, 364/505, 556, 557; 137/78.3, 91, 209, 3, 624.12; 101/147, 148; 210/746, 753, 742–744, 765–766; 99/536; 222/57; 424/407

[56] References Cited

U.S. PATENT DOCUMENTS

| | | |
|---|---|---|
| 3,740,148 | 6/1973 | Moroz et al. |
| 3,939,881 | 2/1976 | Scott .................. 141/91 |
| 4,067,690 | 1/1978 | Cuisia et al. .................. 252/387 |
| 4,106,991 | 8/1978 | Markussen . |
| 4,133,273 | 1/1979 | Glennon .................. 110/346 |
| 4,313,899 | 2/1982 | Hain .................. 264/40.1 |
| 4,484,947 | 11/1984 | Marshall . |
| 4,670,058 | 6/1987 | Mark .................. 106/283 |
| 4,715,212 | 12/1987 | Johanson .................. 73/38 |
| 4,897,797 | 1/1990 | Free et al. .................. 364/500 |
| 5,052,451 | 10/1991 | Gentilcore et al. .................. 141/67 |
| 5,226,926 | 7/1993 | Matsuzaki .................. 44/530 |
| 5,256,169 | 10/1993 | Roe .................. 44/626 |
| 5,322,405 | 6/1994 | Swensson et al. .................. 414/137.4 |
| 5,439,497 | 8/1995 | Boles .................. 71/63 |

*Primary Examiner*—Emanuel T. Voeltz
*Assistant Examiner*—Cuong H. Nguyen
*Attorney, Agent, or Firm*—Alexander D. Ricci; Richard A. Paikoff

[57] ABSTRACT

In a material handling system in which a chemical treatment and water are added to a bulk solid, a method and apparatus for minimizing the amount of moisture added to the bulk solid while effectively controlling dust in the system. A moisture analyzing means monitors the surface moisture level of the bulk solid, and a calibration/measuring means determines the proper amount of chemical and water to be fed to the system for dust control. There are associated means for feeding the chemical treatment and water to the bulk solid, and a dust analyzing means, which monitors dust levels in the system and sends an electrical signal to the calibration/measuring means in order to adjust chemical feed and water flow in the system.

17 Claims, 3 Drawing Sheets

5,777,890

CONTROL OF MOISTURE ADDITION TO BULK SOLIDS

FIELD OF THE INVENTION

The present invention relates generally to dust control devices and more particularly to a device and system for minimizing the amount of moisture in a material handling system when adding chemicals to the system, and is suited to minimize the amount of moisture added to bulk solids, including solid fuels.

BACKGROUND OF THE INVENTION

The heart of any boiler is its fuel system. Fuel handling and storage problems can limit the efficiency of the entire boiler. Solid fuels (including coal, wood and solid waste) present many handling difficulties. Problems occur unless a free-flowing, continuous supply of fuel that is properly sized for the specific type of combustion equipment is provided. The problems include sizing, shredding or pulverizing, consistency of moisture content, freezing or lumping, and dusting.

Most problems can be minimized or eliminated through proper selection of fuel handling equipment. Specific types of equipment for handling, storage, and preparation depend on the characteristics of the solid fuel used.

Because the proper equipment is not always available, fuel additives or aids have been used in the attempt to minimize problems. These additives include grinding aids, moisture improvers, dusting aids, freezing inhibitors, and catalysts to minimize combustibles in ash and fly ash handling systems.

Based on various studies that indicate a BTU penalty on the addition of moisture to fuels, it has become important to attempt to minimize the amount of moisture to the fuels, while also providing a plant with additional monitoring so that it can calculate heat rate from the fuels. By using the type of control system as described in the present invention, the amount of moisture added to the fuels in dust suppression chemicals, water and glycol/water additives may be minimized.

SUMMARY OF THE INVENTION

The present invention relates to a system to control dust, chemical feed, water addition and glycol application to a solid fuel (e.g., coal, wood or solid waste) handling system. A moisture analyzer is utilized in order to control the addition of water and chemicals to the fuel. As surface moisture increases on the fuel, dusting potential is lower, and the demand for dust control is lower. An infrared moisture scanner may be used as a secondary signal in order to monitor and maintain dust levels at lower chemical/water feed. All material treatments affected by surface moisture, e.g., dust control, freeze control, flow aids, or anti-caking agents for bulk solids would be expected to benefit from the present invention.

In an alternative embodiment of the present invention, the moisture analyzer is used along with temperature indicators in order to control freeze control agent (e.g., glycol or brine solution) addition.

DETAILED DESCRIPTION OF THE INVENTION

The present invention relates generally to dust control devices and more particularly to a device and system for minimizing the amount of moisture in a material handling system when adding chemicals to the system. The present dust control device is ideally suited to minimize the addition of the amount of moisture added to fuels and to provide a plant with additional monitoring so that it can calculate the heat rate from fuels. This is advantageous, in that recent studies indicate a BTU penalty on the addition of moisture to fuels. Using the type of control system encompassed by the present invention, the amount of moisture added to fuels in dust suppression chemicals, water and glycol/water additives is minimized. The present dust control device includes a moisture analyzing means (infrared moisture scanner) which maintains the surface moisture level of the material, and calibration/measuring means for determining the proper amount of chemical and water to be fed to the system for dust control, thereby minimizing moisture addition to the material. The present device may optionally comprise a dust control system for foam suppression chemical feed. The operation of the dust control system using foam suppression chemical feed system is slightly different than "wet suppression", but can be incorporated with a wet suppression system in order to provide a complete dust control program for various materials. The present invention may further optionally include feeding a material, such as a glycol, e.g., ethylene glycol, which is fed on the material to be conveyed in order to prevent problems of frozen material or material freezing to conveyor belts.

BRIEF DESCRIPTION OF THE DRAWINGS

Other objects, advantages and novel features of the invention will become more apparent from the following detailed description of the invention when considered in conjunction with the accompanying drawings wherein.

DESCRIPTION OF THE PREFERRED EMBODIMENTS

Figure 1:
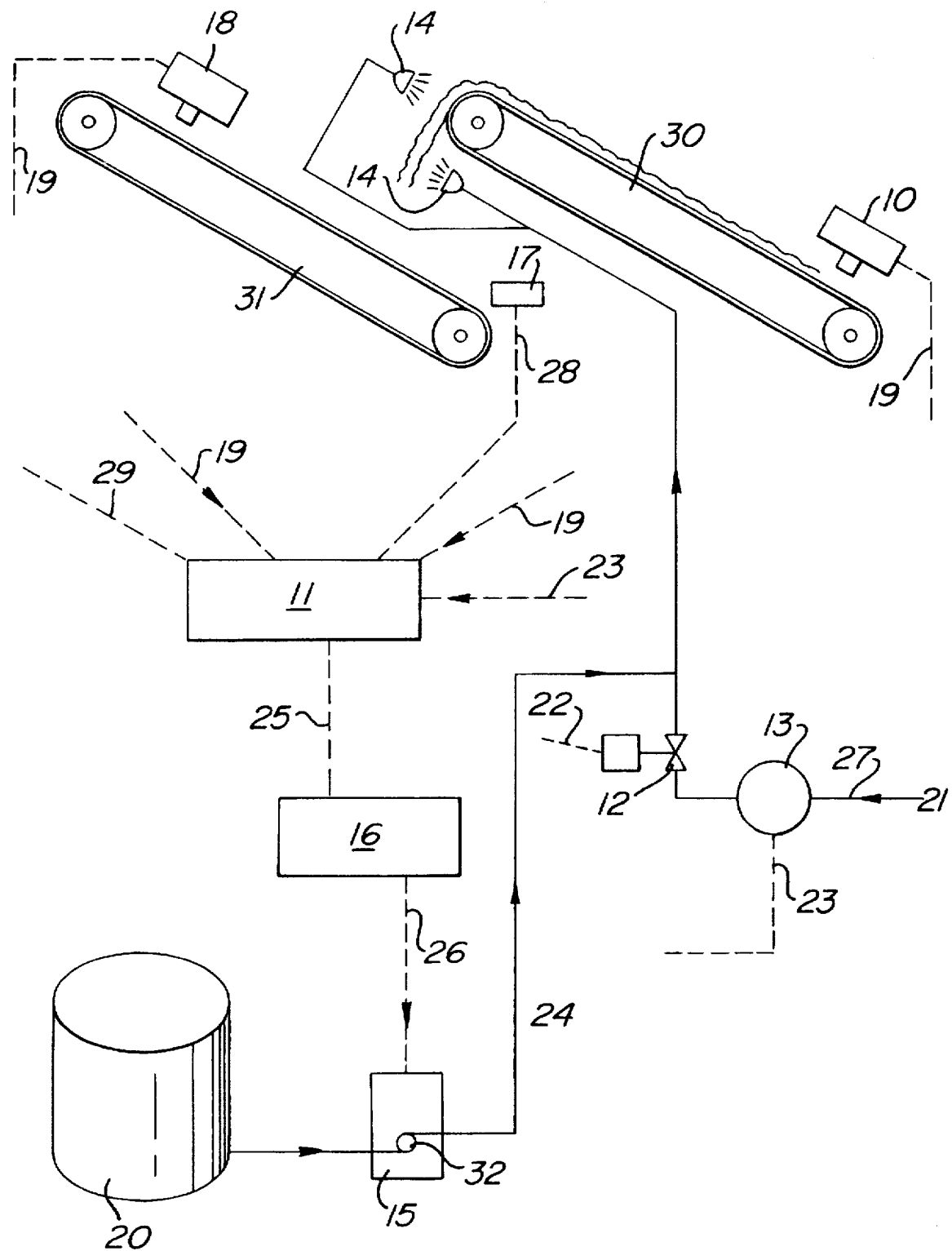
FIG. 1 schematic drawing of a dust control system for wet suppression chemical feed.

Referring now to the drawings wherein like characters designate like or corresponding parts in each of the respective schematic drawings, in FIG. 1, there is shown at 10 a moisture analyzing means (infrared moisture scanner) which monitors the surface moisture level of the material (bulk solid) to be transferred, which is added first via a material conveyor belt 30, followed by a conveyor 31 to the plant. An algorithm would be set up in order to determine the dustability of the material versus surface moisture.

The moisture analyzing means will send an electrical output 19 (e.g., 4–20mA) to a calibration/measuring means 11 (programmable logic controller, or PLC) which will determine the proper amount of chemical (stored in tank 20) and water 21 to be fed for dust control in order to minimize moisture addition to the material. An algorithm will be developed for each particular material to be treated. The PLC will send a signal 22 to a water control valve 12 to maintain proper water flow as monitored by a water flow meter 13 and spray nozzles 14. The water flow meter 13 will have an e.g., 4–20mA output 23 to the PLC 11 to verify water flow 27 to the nozzles 14. The PLC 11 will trend the flow using the proportional control valve 12 to maintain proper flow based on surface moisture levels.

Chemical feed 24 will be maintained using PLC signals and a control and drawdown assembly, e.g. as disclosed in U.S. Pat. No. 4,897,797, herein incorporated by reference. The chemical feed signal 25 will come from the PLC to the control panel 16. This will send the signal 26 to the drawdown assembly 15, which will then calibrate the chemical pump 32 and maintain proper feedrates in mils per minute or ppm as so calculated by the algorithm from the PLC. Chemical feed will be maintained to provide adequate dust control of the material and to maintain the proper proportion of chemical and water to the material being treated.

A secondary signal using a dust analyzing means 17 will be incorporated to provide proper treatment levels to maintain dust control of the material being treated. The dust analyzing means will send a signal 28 (e.g., 4–20mA) that will be used as a trend to further increase or decrease chemical feed and water flow as necessary in order to maintain prescribed dust levels for that location.

A means for determining the heat rate loss of the fuel (secondary infrared moisture scanner, 18) will be used for instances where coal or other materials are being burned. This will allow a plant to have a secondary check on surface moisture going up into e.g., the fuel bunkers, and then have the signal information 29 to calculate heat rate loss due to excessive moisture on the fuel. This unit will also be used to determine the amount of moisture adhering to the fuel after treatment.

Figure 2:
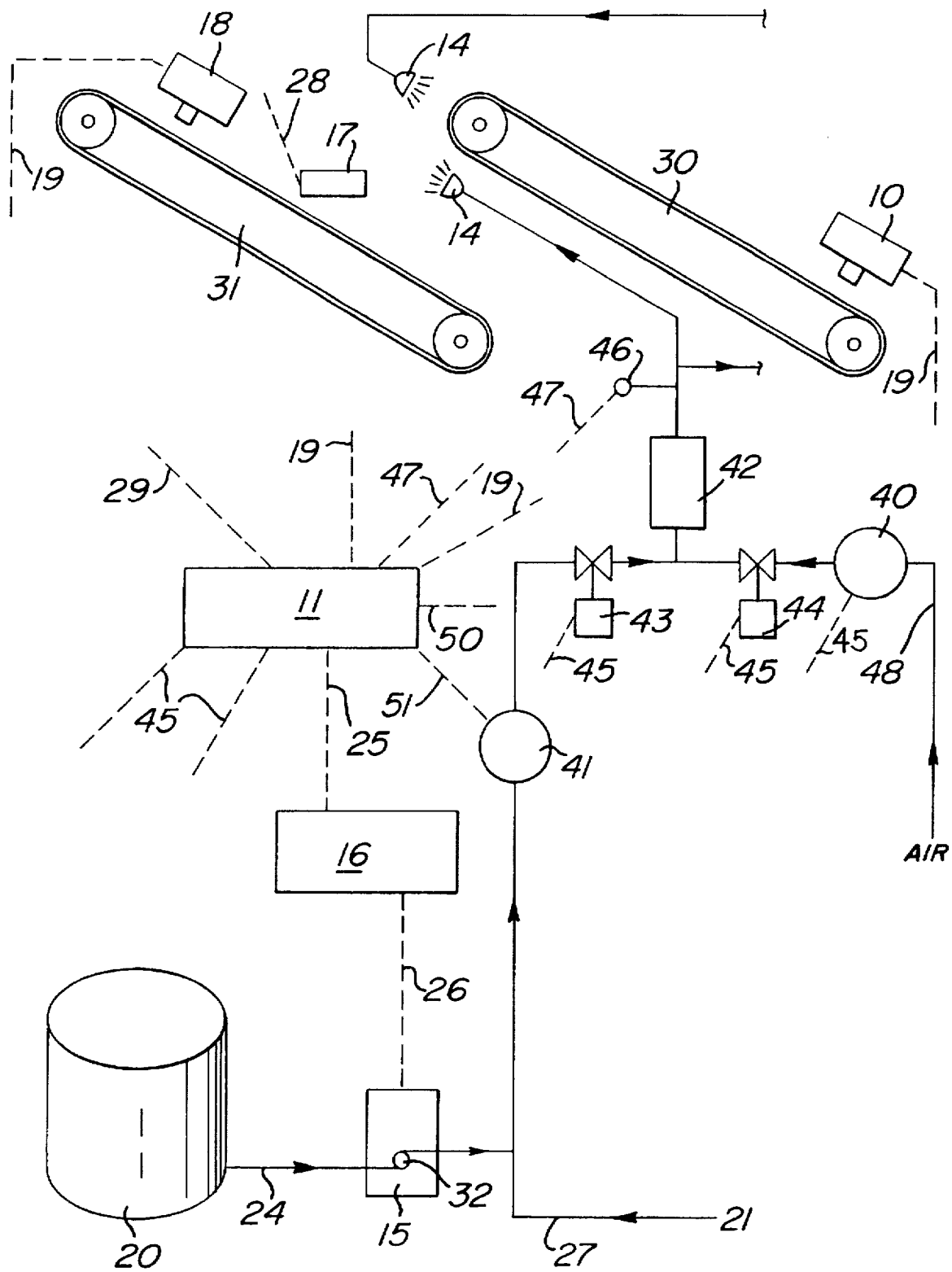
FIG. 2 is a schematic drawing, like FIG. 1, of an alternate embodiment of the dust control system installed with air and water flow meters, a pressure sensor and a foam generator.

In an alternative embodiment of the present invention (FIG. 2), a dust control system for foam suppression chemical feed may be established. As previously described, the moisture analyzing means 10 will be used to monitor surface moisture level of the material to be treated. The output signal 19 will come from the moisture analyzing means 10 to the PLC 11. The PLC will then calculate proper feed rate based on algorithms programmed into it, and will send signals 25 and 26 to the control and drawdown assembly for the appropriate chemical feed for that particular dusting application. Air flow 40 and water flow 41 meters will provide flow signals 50 and 51 back to the PLC, so that it can proportionally control the water 27, chemical feed 24, and air flow 48 to a foam generator 42. Proportional control valves (water, 43 and air, 44) would receive a signal 45 from the PLC to maintain proper water and air flows to the foam generator 42 in order to generate the proper quality of foam. A pressure sensor 46 associated with the foam generator 42 provides for proper expansion of the chemical in the foam generator. There will be an output 47 from the pressure sensor 46 to the PLC. The PLC will be programmed to maintain the effluent pressure of the foam generator 42 and will adjust an air control valve 44 in order to provide a suitable dry foam.

As with the previous embodiment, a dust analyzing means 17 and secondary infrared moisture scanner 18 may also be utilized. Each embodiment is constructed so that the PLC may also receive a signal from fuel scales, so that chemical may be fed not only based on surface moisture, but also on tonnage of fuel being treated.

Figure 3:
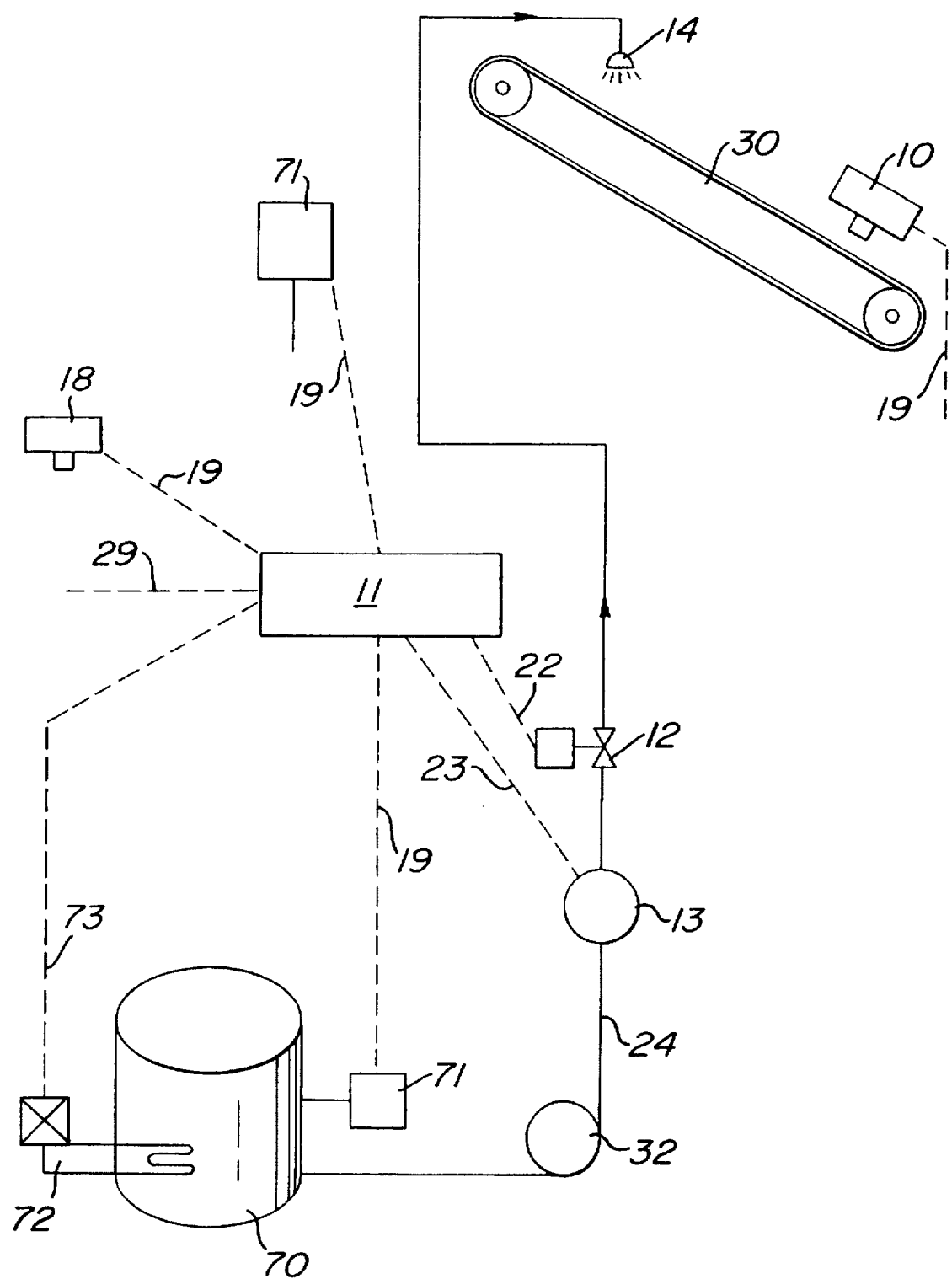
FIG. 3 is a schematic drawing, like FIG. 1, of a further alternate embodiment of the present invention, a glycol control system for the control of frozen material.

In a further embodiment of the present invention (FIG. 3), a glycol (stored in tank 70, e.g., ethylene glycol) may be fed on the material to be conveyed in order to prevent problems of frozen material or material freezing to conveyor belts. A moisture/temperature analyzing means (infrared moisture scanner 10 and temperature sensor 71) will monitor the surface moisture level and temperature of the bulk solid. (The basic operation of this system is the same as found in FIG. 1). This system will thus minimize the amount of moisture added to the fuel, while effectively controlling dust and substantially preventing the freezing of the fuel. The glycol may optionally be heated (by heater 72 sending output 73 to PLC, 11) based on ambient temperature. The warmer glycol will more rapidly penetrate frozen material, with the water used for carrier partially evaporating, thus maintaining a proper concentration of glycol and water, as the water in the material will melt and dilute glycol levels.

While this invention has been described with respect to particular embodiments thereof, it is apparent that numerous other forms and modifications of this invention will be obvious to those skilled in the art. The appended claims and this invention generally should be construed to cover all such obvious forms and modifications which are within the true spirit and scope of the present invention.

We claim:

1. In a material handling system in which a chemical treatment including a glycol and water are added to a bulk solid, an apparatus for minimizing the amount of moisture added to said bulk solid while effectively controlling dust in said system, comprising:

a moisture analyzing means, which monitors the surface moisture level of the bulk solid;

calibration/measuring means for determining the proper amount of chemical and water to be fed to the system for dust control, said calibration/measuring means receiving the moisture level of the bulk solid from the moisture analyzing means;

means for feeding the chemical treatment and water to the bulk solid; and a dust analyzing means, which monitors dust levels in the system and sends a signal to the calibration/measuring means in order to adjust chemical feed and water flow in the system.

2. The apparatus as recited in claim 1 further comprising means for determining the heat rate loss of said bulk solid.

3. The apparatus as recited in claim 1 further comprising means for monitoring the temperature of said bulk solid.

4. The apparatus as recited in claim 3 wherein said chemical treatment includes a glycol.

5. The apparatus as recited in claim 4 wherein said glycol substantially prevents the freezing of said bulk solid.

6. The apparatus as recited in claim 4 wherein said glycol is ethylene glycol.

7. The apparatus as recited in claim 1 wherein said bulk solid is a solid fuel.

8. The apparatus as recited in claim 7 wherein said solid fuel is coal.

9. The apparatus as recited in claim 7 wherein said solid fuel is wood.

10. The apparatus as recited in claim 7 wherein said solid fuel is solid waste.

11. In a material handling system in which a chemical treatment and water are added to a bulk solid, a method for minimizing the amount of moisture added to said bulk solid, while effectively controlling dust and substantially preventing the freezing of said bulk solid, said method comprising providing:

a moisture/temperature analyzing means, which monitors the surface moisture level and temperature of the bulk solid;

calibration/measuring means for determining the proper amount of chemical and water to be fed to the system for dust control, said calibration/measuring means receiving the moisture level of the bulk solid from the moisture/temperature analyzing means;

means for feeding the chemical treatment and water to the bulk solid; and a dust analyzing means, which monitors dust levels in the system and sends a signal to the calibration/measuring means in order to adjust chemical feed and water flow in the system, wherein said chemical treatment includes a glycol.

12. The method as recited in claim 11 further comprising providing means for determining the heat rate loss of said bulk solid.

13. The method as recited in claim 11 wherein said glycol is ethylene glycol.

14. The method as recited in claim 11 wherein said bulk solid is a solid fuel.

15. The method as recited in claim 14 wherein said solid fuel is coal.

16. The method as recited in claim 14 wherein said solid fuel is wood.

17. The method as recited in claim 14 wherein said solid fuel is solid waste.

* * * * *